US005477642A

United States Patent [19]
Legendre

[11] Patent Number: 5,477,642
[45] Date of Patent: Dec. 26, 1995

[54] DEVICE FOR ACTUATING A PIVOTING CLOSURE MEMBER

[75] Inventor: Dominique Legendre, Le Mans, France

[73] Assignee: Societe Anonyme Corea, Spay, France

[21] Appl. No.: 168,388

[22] Filed: Dec. 17, 1993

[51] Int. Cl.⁶ .................................................. E05F 11/24
[52] U.S. Cl. .................................................. 49/340; 49/324
[58] Field of Search ............................ 49/324, 340, 333, 49/334, 335, 336, 338

[56] References Cited

U.S. PATENT DOCUMENTS

| | | | |
|---|---|---|---|
| 3,481,076 | 12/1969 | Bedard | 49/324 X |
| 3,641,706 | 2/1972 | Carlson et al. | 49/324 |
| 3,996,698 | 12/1976 | Rees et al. | 49/324 |
| 4,142,761 | 3/1979 | Lutz et al. | 49/324 X |
| 4,186,524 | 2/1980 | Pelchat | 49/324 |
| 4,249,771 | 2/1981 | Gergoe et al. | 49/324 X |
| 5,110,175 | 5/1992 | Fischbach | 49/324 X |
| 5,161,419 | 11/1992 | Moy et al. | 49/324 X |
| 5,203,113 | 4/1993 | Yagi | 49/324 |

FOREIGN PATENT DOCUMENTS

| | | | |
|---|---|---|---|
| 0246904 | 11/1987 | European Pat. Off. | |
| 352206 | 1/1990 | European Pat. Off. | 49/324 |
| 935173 | 2/1956 | Germany . | |

Primary Examiner—Peter M. Cuomo
Assistant Examiner—Jerry Redman
Attorney, Agent, or Firm—Young & Thompson

[57] ABSTRACT

An actuating device for a pivoting closure member of the type comprising at least one rod (10, 11) articulated at one end on the closure member (14) connected at its other end to motor members. According to the invention, the motor members mounted fixedly on a support are constituted by a pair of pneumatic linear actuators or a pneumatic linear actuator/return device which act on the respective ends of a member which interconnects them to opposite tractive forces that are non-simultaneous, so as to impart to the connecting member a linear reciprocating movement adapted to be transformed into rotational movement, this rotational movement being transmitted by a suitable transmission member (9) to the rod (10, 11).

5 Claims, 2 Drawing Sheets

DEVICE FOR ACTUATING A PIVOTING CLOSURE MEMBER

The invention relates to a device for actuating a pivoting closure member such as a pivoting window or roof of a vehicle.

The manually controlled actuating devices adapted to move a closure member of a vehicle so as to move it by pivotal motion from the open position to the closed position or vice versa, as the case may be, thanks to a device disposed adjacent the element to be moved, or by means of a remote actuating member, are known.

Also known for opening side rear windows, are conventional toggle joint systems which unfortunately are not accessible to the driver when driving. It has therefore been proposed to provide remote control devices particularly as disclosed in U.S. Pat. No. 3,740,093 and FR-A-2.449.185.

U.S. Pat. No. 3,740,093 relates to a device comprising a crank disposed on the dashboard of the vehicle and connected to the actuating mechanism of the closure element by means of a flexible framework. The crank drives in rotation the cable which effects rotation of the actuating mechanism for opening and closing the front window of the vehicle disposed opposite that of the driver.

FR-A-2.449.185 discloses a device comprising two identical actuating members spaced from each other and interconnected by a flexible cable. The first actuating member is driven in rotation by a manual control handle directly accessible to the driver. The actuating member converts this rotating movement to a linear movement of the flexible member which then drives the rear actuating member which effects a new conversion of the movement and transmits this movement of rotation to a pivoted rod of the overcenter type which connects the actuating member to the window.

Finally there is known from FR-A-2.665.479 an actuating device of the type comprising a rod articulated at one end on the closure member and connected at its other end to a rotatable member driven in rotative movement by a cable controlled by a motor member such as a pneumatic linear actuator, the connection between the articulated rod and the rotatable member being effected by means of a conical pinion engaging with a toothed sector of said rotatable member, the axis of the conical pinion being substantially orthogonal to the axis of rotation of said rotatable member.

This latter device, although operative, does not afford all the conditions of reliability that are desired, because of its use of cables. It is moreover relatively bulky.

One of the objects of the present invention is therefore to provide a pneumatically controlled actuating device of small size permitting remotely controlling, by an occupant in the front of the vehicle, a pivotal movement of a closure member such as a pivoting roof or window of the vehicle between a closed position and an open position.

The invention has therefore for its object an actuating device for a pivoting closure member such as a pivoting vehicle window or roof of the type comprising at least one rod articulated at one end on said closure member and connected at its other end by suitable coupling and transmission means to motor members, characterized in that the motor members fixed to a support are constituted by a pair of pneumatic linear actuators, or a pneumatic linear actuator/ return means, or a double acting linear pneumatic actuator which exerts on a member which connects them two opposed non-simultaneous tractive forces so as to impart to said connecting member an alternating movement adapted to be transformed into a rotating movement, this rotating movement being transmitted by a suitable member, such as a transmission axle, to said rod.

In a preferred embodiment of the invention, the linear pneumatic actuator comprises a body comprised by a forward portion and a rear portion gripping, at their joining plane, the external edge of a deformable membrane so as to delimit with this latter at least one chamber of variable volume adapted to be subjected either to atmospheric pressure, or to an underpressure, by means of an air inlet provided in said chamber, said membrane comprising a substantially central opening closed by means of forward and rear cups disposed on opposite sides of the membrane, the forward cup being mounted fixedly on the connecting member, the rear cup coming into abutment against the rear portion of the body of the jack when the chamber is subjected to an underpressure.

Other characteristics and advantages of the invention will become apparent from a reading of the description which follows and the accompanying drawings, which description and drawings are given only by way of example. In the drawings.

Figure 3:
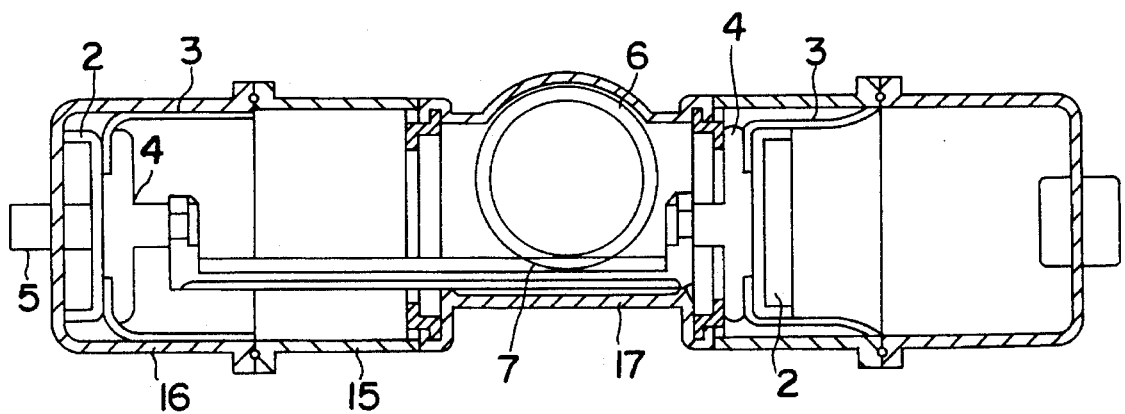
FIG. 3 shows in cross-sectional view on a vertical plane in FIG. 1 the motor members associated with the members for transformation of linear movement into rotational movement of the device.

The actuating device for a closure member according to FIG. 3 comprises at least two motor members mounted fixedly on a support.

In the example shown in FIG. 3, the motor members are constituted by two pneumatic linear actuators of the type comprising a membrane 3 mounted fixedly at its periphery in the joint plane of the forward and rear portions 15 and 16 constituting the body of the jack. This elastically deformable membrane 3 is provided substantially centrally with an opening closed by means of forward and rear cups 2 and 4 fixed at their periphery on said membrane 3. Said cups are so shaped that the rear cup 2 comes to bear against the bottom of the rear portion 16 of the jack body when the chamber delimited by this rear portion 16 of the jack body and the membrane 3 are subjected to underpressure. This position is shown by the actuator disposed to the left in FIG. 3. Conversely, when the chamber delimited by the membrane 3 and the rear portion of the body is subjected to atmospheric pressure, the membrane 3 tends to move in the direction of the forward portion 15 of the body of the jack. This displacing under atmospheric pressure or subjection to underpressure of the chamber delimited by the membrane and the rear portion of the body of the jack is effected by means of an outlet tube 5 carried by the rear portion 16 of the jack body. This outlet tube 5 is adapted to be connected by means of a pipe or any other suitable means to a source of underpressure.

The forward cups 4 of each of the motor members are interconnected by means of a connection member constituted by a rack 7. This connection member is adapted to be moved with alternating movement during displacement of said membranes 3 provided the actuators are mounted such that they can exert opposite and non-simultaneous tractive forces. Thus, in the example shown in FIG. 3, when the left actuator chamber is subjected to underpressure, the membrane deforms so as to press against the bottom of the rear portion 16 of the jack body and thus exerts a tractive force which drives the rack 7 to the left in FIG. 3. As to the right actuating chamber, it is subjected to atmospheric pressure. This means that its membrane 3 is freely deformable and that its forward cup 2 can thus be pressed against the bottom of the forward portion 15 of the jack body when it is driven by the displacement of the rack 7. Obviously, for movement of the rack 7 to the right, the principle is the same.

Figure 1:
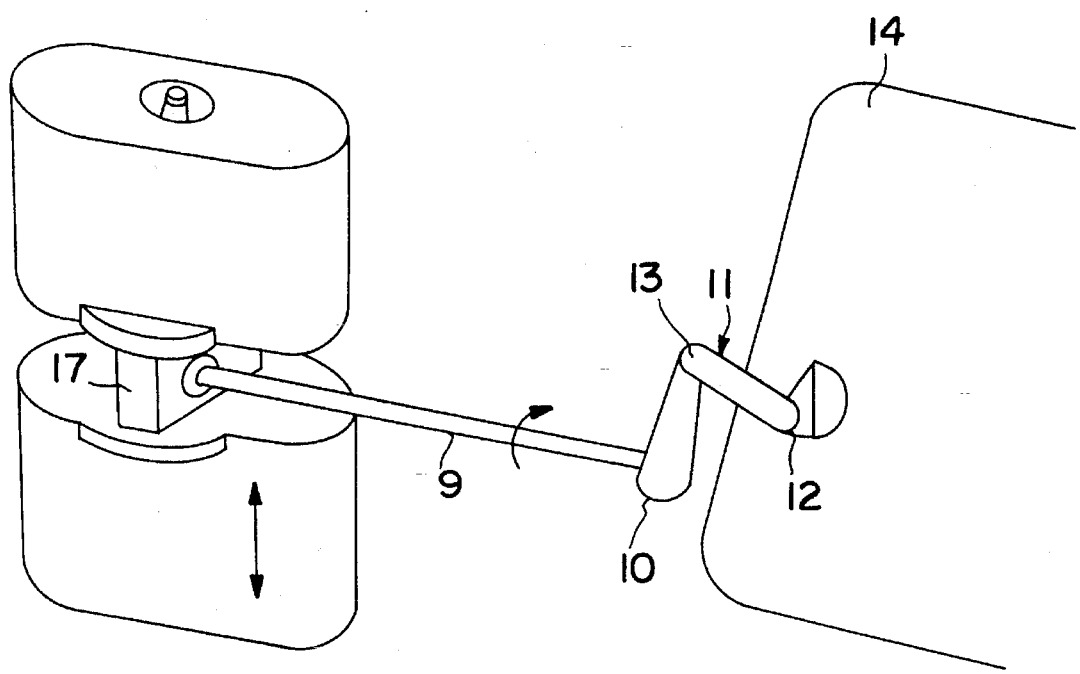
FIG. 1 shows a perspective view of the device according to the invention.

This reciprocating movement of the rack 7 is indicated schematically by the double arrow in FIG. 1, although of course the rack 7 is not visible in FIG. 1 because the casing shown to the left of FIG. 1 is not broken away and the rack is inside that casing, as is evident from FIG. 3.

This alternating movement can then be transformed into movement of rotation. To do this, there is used a pinion 6/rack 7 system known per se. The pinion 6 is disposed so as to mesh with the rack 7 to be driven in rotation during displacement of the rack 7. It will be noted that, in the example shown in FIG. 3, the actuators, in addition to their connection by the connecting member 7, are also interconnected by two half-cups 17 which enclose and mask the pinion 6 and the rack 7. In this arrangement, the pinion 6 is provided with a hole which can be all the way through or not, preferably square, adapted to receive a transmission shaft 9 as shown in FIG. 1. This transmission shaft 9 terminates in a crank arm or rod 10 which itself comprises a universal joint 12 such as a ball 13 so as to drive in rotation a rod 11 which itself again terminates by a universal joint 12 such as a ball which can be secured to the closure member. The operation of such a device is schematically shown in FIGS. 2A and 2B.

Figure 2A:
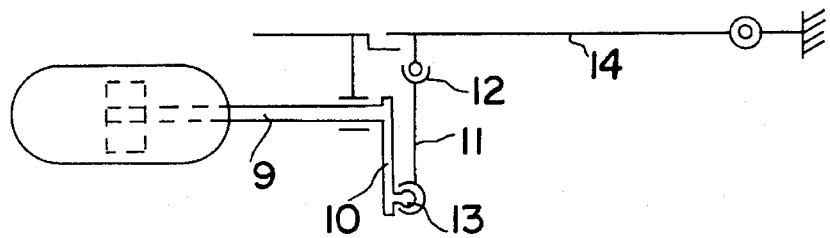
FIG. 2A shows in simplified schematic view the closure device in closed position.
Figure 2B:
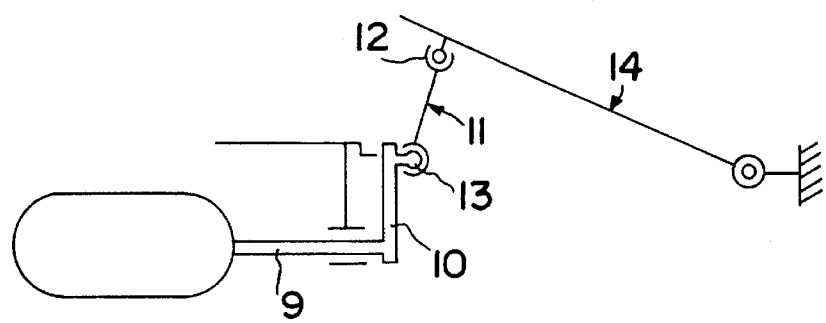
FIG. 2B shows in schematic view the same device in open position.

In the case of a closed window, the crank will have its crank arm 10 downward as seen in FIG. 2A and disposed parallel to the rod 11. In the case of an open window, there is obtained on the contrary an arrangement of the type shown in FIG. 2B, in which the crank arm 10 is in upper position and the rod 11 is in prolongation of said arm 10. In the operative position, the actuating device, shown by the transmission shaft 9 and the rods or cranks, is disposed on a panel of the chassis adjacent the freely swinging edge of the closure member and opposite the pivoted edge as shown in FIG. 1. The control of the actuators is effected by means of switches disposed on the dashboard. However, for safety reasons, this control could also be effected manually. There will be provided for doing this, manual drive means for the rack 7 or the pinion 6 or if desired the transmission axle 9.

According to another embodiment of the invention, not shown, it is also possible to replace the second actuator by resilient return means disposed at one end of the connecting member 7, said resilient means subjecting the connecting member 7 to a linear movement in a direction opposite that provided by the actuator. It is to be noted that the pinion 6 could be oriented 360° about the axis of the jacks constituted by the two actuators thanks to a suitable notched device.

It is also possible to replace the pair of linear actuators by one double acting pneumatic linear actuator such as that described for example in French application No. 92.06970 filed by the applicant on Jun. 10, 1992.

Thus, the operation of such a device is as follows. When one of the chambers of one of the actuators is subjected to an underpressure, the membrane deforms and exerts a pull on the rack 7. The rack then drives in rotation the pinion 6 which itself is mounted fixedly on the transmission axle 9. This transmission shaft terminating in a crank arm 10 drives in rotation said crank arm. This crank arm transmits, by means of a rotatable coupling 13, its pivoting movement to a second rod 11 which then controls the opening of the closure member, again by means of a rotary connection 12. The closing of the closure member is controlled by a second actuator exerting an opposite pull on the rack 7. This of course presupposes that, when the chamber of one of the actuators is subjected to underpressure, the chamber of the other actuator is at atmospheric pressure, and vice versa. Of course, it is possible also to utilize multiposition actuators.

What is claimed is:

1. Device for actuating a pivoting closure member, comprising at least one rod (10, 11) articulated at one end on said closure member (14) and connected at its other end by coupling and transmission means to motor members, the motor members being mounted fixedly on a support and being constituted by at least one pneumatic linear actuator that imparts to a connection member (7) a reciprocating linear movement adapted to be transformed into movement of rotation, this movement of rotation being transmitted by a suitable transmission member (9) to said rod (10, 11), wherein the linear pneumatic actuator comprises a body formed from a forward portion (15) and a rear portion (16), gripping, at a joint plane between them, an external edge of a deformable membrane (3) so as to delimit at least one variable volume chamber adapted to be subjected either to atmospheric pressure or to an underpressure by means of an air inlet provided in said chamber, said membrane (3) comprising a substantially central opening closed by means of forward and rear cups (4 and 2) disposed on opposite sides of the membrane (3), the forward cup (4) being mounted fixedly to the connection member (7) the rear cup coming into abutment on a rear portion of a jack body when the chamber is subjected to underpressure.

2. Device according to claim 1, wherein the connection member (7) is a rack which coacts with a pinion (6) meshing with a toothed sector of said rack, said pinion (6) being provided with a hole receiving said transmission member (9) for the transmission of rotational movement to the rod.

3. Device according to claim 1, wherein the opening-closing device for the closure member is constituted by a crank (10) mounted fixedly at one end of the transmission shaft (9), said crank (10) terminating at its other end in a universal joint (13), so as to transmit its pivoting movement to a rod (11) which then controls the opening or closing of the closure member by means of another universal joint (12).

4. Device according to claim 1, wherein the actuators are mounted fixedly on a support (17) forming a frame for the pinion (6) and the rack (7), said frame being constituted by two elements of complementary shape and juxtaposed with each other, said elements being secured together by means of projections and recesses.

5. Device for actuating a pivoting closure member, comprising at least one rod (10, 11) articulated at one end on said closure member (14) and connected at its other end by coupling and transmission means to motor members, the motor members being mounted fixedly on a support and being constituted by at least one pneumatic linear actuator that imparts to a connection member (7) a reciprocating linear movement adapted to be transformed into movement of rotation, this movement of rotation being transmitted by a suitable transmission member (9) to said rod (10, 11), wherein the motor members are constituted by a pneumatic linear actuator disposed at one end of the connection member (7) and by resilient return means disposed at the other end of the connection member (7), said resilient return means driving the connection member (7) with linear displacement in a direction opposite that imparted by the actuator.

\* \* \* \* \*